Dec. 26, 1944. J. JOYCE 2,365,823
AUTOMOBILE SIGNALING DEVICE
Filed Feb. 26, 1942 2 Sheets-Sheet 2
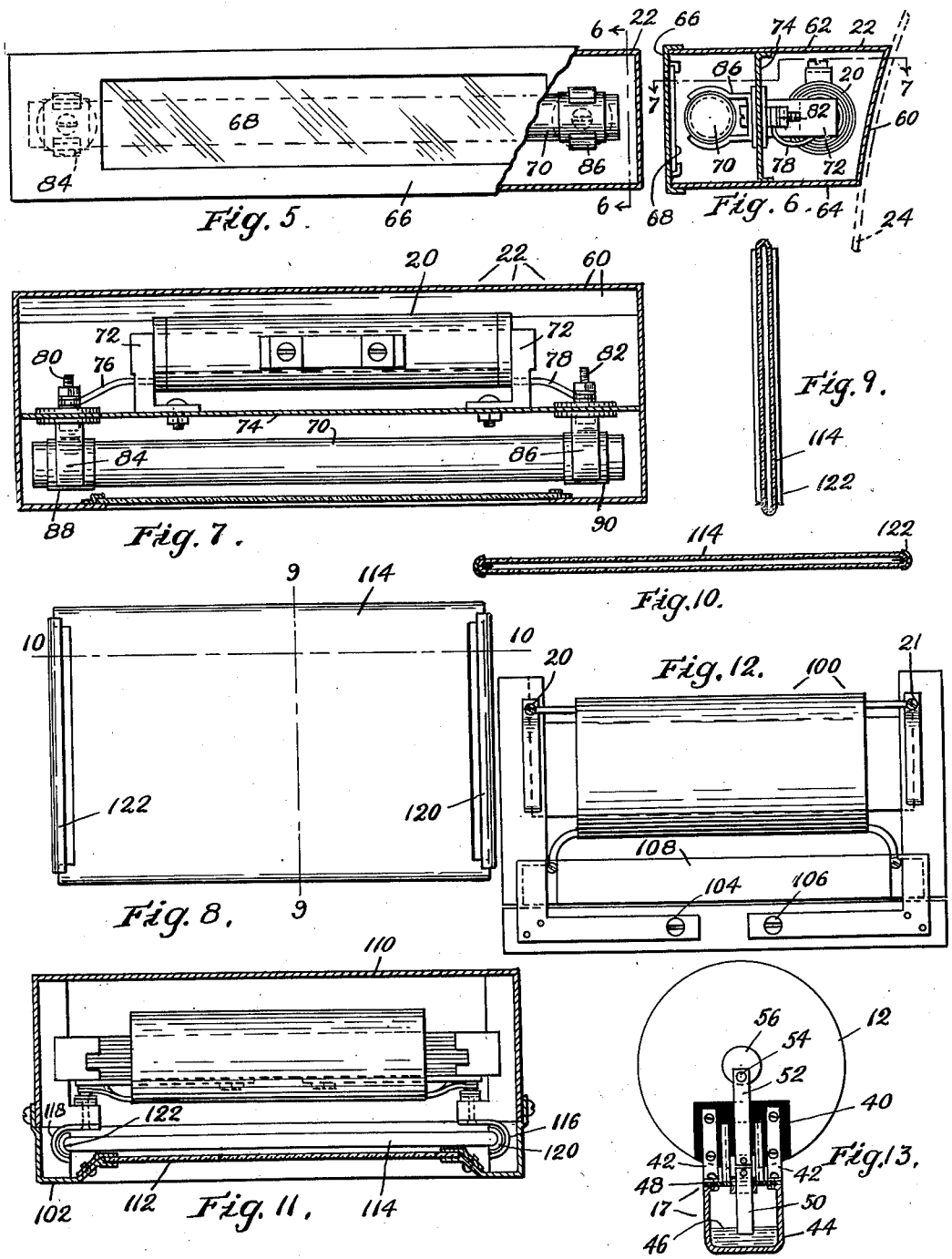
Inventor
John Joyce Patented Dec. 26, 1944

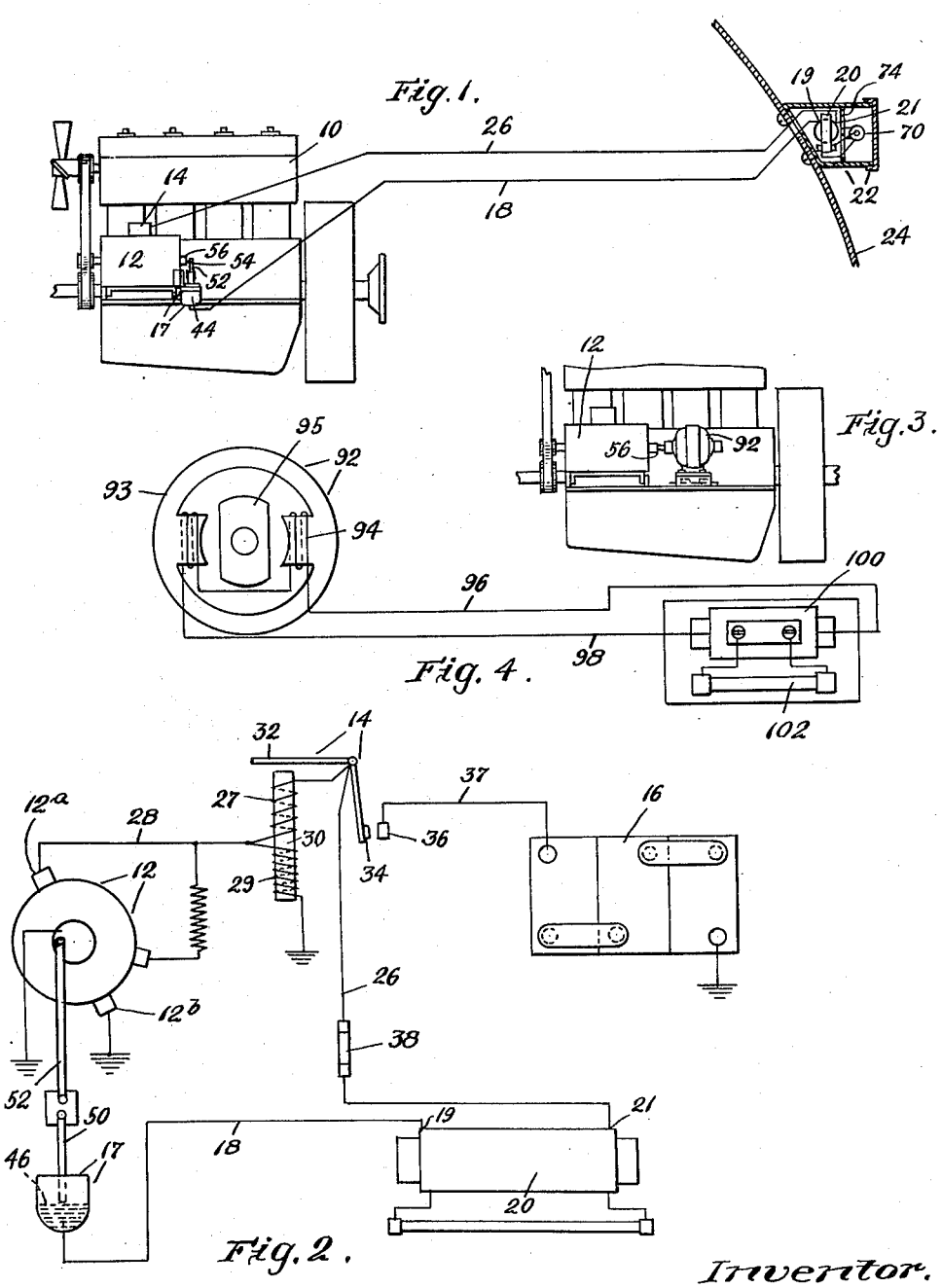

2,365,823

UNITED STATES PATENT OFFICE 2,365,823

AUTOMOBILE SIGNALING DEVICE

John Joyce, Dorchester, Mass.

Application February 26, 1942, Serial No. 432,445

1 Claim. (Cl. 177—311.5)

The present invention relates to signal lights and, as herein illustrated, relates more particularly to stop and warning lights for use on motor driven vehicles.

Stop lights for use in automobiles of the type wherein a signal light is energized upon application of the brake of the vehicle are in common use. Such a light is effective to warn the operator of the following car that the leading car is about to stop. Such lights, however, are normally unenergized and are lighted only when the operator applies pressure to the brake to slow down or stop the car. There is no means for determining whether such a light is operative and the operators of following cars have to take it for granted that this type of stop light although not lighted is in good working order. Thus, if the light is defective and it becomes necessary for the operator of the vehicle to stop suddenly, the operator of the following car has no warning and hence may collide with the leading car. Stop lights which are energized only when the brake of the vehicle is applied, under most conditions of use, are effective as signaling devices but when they are defective fail to give warning to operators of other cars.

It has been found desirable not only to warn the operator of the following car that the leading car is about to stop but it is also desirable that the operator of the following car be advised at the instant that the change of speed takes place that the leading car is slowing down or picking up speed. With the present commonly used types of signal device, it is impossible to advise the operator of the following car as to changes in speed of the leading car at the instant such changes of speed take place.

One object of the invention, therefore, is to provide a signal device for motor vehicles which will certainly and under all conditions advise the operator of the following car as to changes of speed of the leading motor vehicle at the time that the change of speed takes place. To this end, and in accordance with one feature of the invention, a signal light is provided which at normal operating speeds of the motor vehicle will normally be lighted or energized and the light will appear to glow steadily. Thus, with a fast moving vehicle, a steady light will be showing but when the speed of the vehicle drops below a predetermined rate of speed as, for illustration, twenty miles per hour, the light visibly will be lighted and extinguished periodically and at slower intervals as the speed of the motor vehicle decreases, thus informing the operator of the motor vehicle that the leading motor vehicle is slowing down and is about to stop. If the engine is idling after the motor vehicle is stopped, the light, with one adaptation of the invention will go on and off at a low frequency, but if the engine is stopped, the light will be out. If the motor vehicle starts from a stop the frequency of the light will steadily increase as the engine and vehicle pick up speed and when the speed of the car exceeds some predetermined rate of speed, as for instance the above noted twenty miles per hour, the light will appear to be steady and continuous. Thus, the operator of the following motor vehicle is enabled not only to determine whether the leading motor vehicle is about to stop but is also enabled to determine when the leading motor vehicle is accelerated. The frequency of illumination also gives the viewer an indication of the speed of the vehicle.

Another object of the invention is to provide a signaling device which is automatically controlled and which will be effective to warn the operator of the following motor vehicle of changes of speed of the leading motor vehicle at the instant that such changes of speed are made.

Another object of the invention is to improve generally upon the construction and operation of signaling devices for motor vehicles.

With the above and other objects and features in view, the invention will now be described with particular reference to the accompanying drawings in which:

Fig. 1 is a view in side elevation illustrating one modification of the present invention;

Fig. 2 is a wiring diagram illustrating the electrical connections of the modification illustrated in Fig. 1;

Fig. 3 is a view in side elevation illustrating another modification;

Fig. 4 is a wiring diagram of the modification shown in Fig. 3;

Fig. 5 is a rear view illustrating the signaling device of Figs. 1 through 4 with a portion of the covering broken away to illustrate the contact structure.

Fig. 6 is a view taken along the line 6—6 of Fig. 5;

Fig. 7 is a view in cross-section taken along the line 7—7 of Fig. 6;

Fig. 8 is a view of a modified form of neon tube;

Fig. 9 is a view in section taken along the line 9—9 of Fig. 8;

Fig. 10 is a view in section taken along the line 10—10 of Fig. 8;

Fig. 11 is a view in section illustrating the neon tube shown in Figs. 8, 9, and 10 assembled within a warning signal casing;

Fig. 12 is a view illustrating the transformer of the present signaling device; and Fig. 13 is a detail view illustrating the construction of the interrupter used in connection with the modification of the invention illustrated in Fig. 1.

Referring now to Figs. 1 and 2 of the drawings, which illustrate a preferred embodiment of the invention, it will be noted that the engine 10 of the motor vehicle is provided with a generator 12 which is provided with the usual type of cut-out 14 which operates automatically to connect the generator electrically to a storage battery 16 when sufficient energy is produced by the generator to move the contact of the cut-out into closed position. The generator 12 is also provided with a circuit interrupter 17 pertinent to the present invention and which is mounted on the rear end face of the generator 12 and insulated therefrom. The interrupter 17 is electrically connected by a conductor 18 to one of the terminals 19 of the primary winding of a transformer 20 mounted in a casing 22, fixed in any suitable manner to a part as a rear wall 24 of the motor vehicle. Another conductor 26 is also provided which leads from the other terminal 21 of the primary winding of the transformer 20 and is electrically connected to the cutout 14 as will later be described.

Referring now to Fig. 2 of the drawings, it will be noted that the generator 12 is provided with a lead 28 which electrically connects a terminal or brush 12a of the generator with a current winding 27 and a voltage winding 29 of the magnet 30 of the cut-out 14. When the voltage winding 29 is sufficiently energized, a contact carrying bell crank lever 32 is moved in a counter-clockwise direction to move a contact 34 on the bell crank 32 into engagement with a stationary contact 36, thus closing the circuit between the generator 12 and the storage battery 16 through the conductor 37 to one terminal of the battery. The other terminal is grounded as is a second terminal or brush 12b of the generator so that the circuit is complete. The conductor 26 is connected at one end to the bell crank lever 32 and at its other end, as above stated, to one of the terminals of the primary coil of the transformer 20. A fuse 38 is placed in the circuit to protect the device against short-circuit. One end of the conductor 18, as above stated, is connected to the other terminal of the primary transformer 20 and at its other end is electrically connected to the interrupter 17 which completes the circuit through the primary coil of the transformer 20.

The interrupter 17, as illustrated in Fig. 13 of the drawings, comprises an insulating block 40 fixed by screws or other suitable means to the end cap of the generator 12 or to any convenient support.

Brackets 42 having substantially horizontally extending lower arms are fixed to the insulating block 40 by machine screws or other suitable fastenings. The brackets 42 support a metallic cup 44 formed of steel or other suitable material. Said cup contains mercury about to the level 46, the cup above the mercury containing oil or other suitable non-conducting and oxidization-preventing fluid. The cup 44 is provided with a cover member 48 formed of hard rubber or other suitable insulating material and is provided with an opening arranged to receive a vertically reciprocating metal plunger 50 which at its upper end is pivotally connected to a crank rod 52, which, in turn at its upper end, is secured by a pin 54 to the shaft 56 of the generator 12 eccentrically of the axis thereof. The plunger 50 and the link 52 are formed of any suitable metal, preferably steel, and are electrically conducting so that the shaft 56, which is grounded and thereby electrically connected with the terminal 12b of the generator can be intermittently electrically connected to the mercury in the cup 44. Thus, when the shaft 56 of the generator 12 is rotated, the circuit between the mercury and the plunger 52 is made and broken during each revolution of the generator shaft 56. Since the cup 44, in which the mercury is contained, is electrically connected to one of the terminals of the primary winding of the transformer 20, the interrupter 17 will make and break the circuit in the primary winding of the transformer once during each revolution of the generator shaft 56. The interrupter preferably is arranged to make and break the circuit quickly with a relatively long period of interrupted circuit.

Referring now to Figs. 5, 6, and 7, it will be noted that the casing 22 in which the transformer 20 is mounted comprises a front wall 60 which is shaped conveniently to coincide with the curvature of the back of the automobile body 24. The upper and lower horizontal walls of the casing are substantially rectangular. The removable rear wall 66 of the casing is provided with forwardly extending flanges which overlie and engage the rear edge portions of the horizontal walls 62 and 64. The rear wall 66 is provided with an opening over which is mounted a transparent cover member 68 through which light from the signal light 70 of the present invention, preferably a neon tube, is visible. The transformer 20 is mounted on suitable brackets 72 which are secured to the forward surface of a substantially vertical partition plate 74 which is secured removably in position within the casing in any suitable manner. Conductors 76 and 78 forming the terminals of the high tension secondary winding of the transformer 20 are electrically connected to binding posts 80 and 82 respectively which extend through the partition plate 74. On the other side of the partition plate 74 and electrically connected to the binding posts 80 and 82 are contact members 84 and 86 in the form of spring clips which are arranged to receive the electrode terminals 88, 90 of the neon tube 70. It is evident from the above that the transformer 20 and the neon light 70 are rigidly fixed to the body of the motor vehicle and that the transformer and tube are conveniently and accessibly mounted to permit removal and replacement of broken and defective parts.

With the above arrangement, each current pulse in the low tension primary winding of the transformer produces a high voltage pulse in the high tension secondary winding and results in a momentary flash or illumination of the neon tube. When the engine 10 is idling, the current pulses in the transformer primary occur at low frequency and hence there are relatively wide periods of time intervening between successive illuminations of the neon tube. When, however, the engine speed increases, and consequently the speed of the generator, the frequency of energizing impulses in the transformer correspondingly increases and hence the flashes of the neon tube correspondingly increase in frequency. When the engine speed corresponds to a car speed of say, twenty miles per hour, the flashes are so frequent as to give the effect of practically continuous illumination. Thus speed changes of the car are indicated as well as the stationary condition thereof when the engine is idling.

Referring now to Figs. 3 and 4, of the drawings, an alternating or pulsating current generator 92 is operatively connected to the shaft 56 of the engine-driven generator 12 or is otherwise driven by the engine at a speed proportional therewith. The generator 92 is provided with a stationary stator 93 having a winding 94 and a rotor 95 which is permanently magnetized and rotated by the engine. With the generator 92 as illustrated, there will be two current pulses for each complete rotation of the rotor. These impulses, through leads 96 and 98, energize the low tension winding of a transformer 100, the high tension winding of which is connected to the neon tube 102. Since the speed of the generator is proportional to the engine speed, the flashings of the neon tube will be slow at low engine speed and faster for faster engine speeds and hence the change of car speed, at low speeds can be determined by observing the change of frequency of the neon tube flashes as with the first modification hereinbefore described. Preferably the design of the generator 92 and its speed relation with the engine speed is such that the successive flashes of the signal light can be observed readily when the car speed is less than some predetermined rate as, say twenty miles per hour.

Referring now to Fig. 12, the terminals of the primary winding of the transformer 100 are designated as 104 and 106 respectively. The transformer 100 is mounted on a base 108 and is enclosed by a casing 110 (Fig. 11) the rear wall of which is provided with an opening to receive a transparent sheet 112 through which a flat neon tube 114 is visible. The neon tube 114 is mounted in contact members 116, 118 which engage terminal electrodes 120, and 122 respectively, fixed to the ends of the neon tube 114. As shown best in Figs. 8, 9, and 10 the neon tube 114 is rectangularly shaped and has substantial vertical height. The chamber within the tube 114 has a volume per unit length which is substantially the same as the volume per unit length of the neon tube 70 shown in Fig. 7. Thus, by the use of this wide flat tube a substantial area is lighted and the rear wall and its transparent sheet 112 if desired may be of any desired configuration to provide some illuminated symbol in addition to providing a warning illumination.

Both of the modifications shown in Figs. 1 and 2, and 3 operate in substantially the same manner. When the car engine is idling, the interval between successive energizing pulses to the signal light is relatively long and hence the intervals between successive flashes of the light are correspondingly long and the separate flashes are readily apparent. When the speed of the motor increases, the frequency of the flashes or energizations of the neon lamp increases and when the vehicle reaches an appropriate speed the frequency of the energizations is so great that the neon lamp appears to be continuously lighted. When the vehicle is slowed down sufficiently, the frequency of the energizations of the neon lamp decreases to a point where the periodic lighting of the neon lamp is visible to the observer and if the motor vehicle further slows down the frequency of the energizations of the neon lamp further decreases to a point where the successive flashes of the neon lamp occur at relatively long intervals. Thus, the operator of the following car is enabled instantly to determine whether or not the leading car is increasing or decreasing its speed and these indications of increase or decrease of speed of the leading car is entirely independent of any control by the operator of the vehicle. A stationary car with engine running is also made known by the slow flashing of the signal light.

A gaseous conduction tube with cold electrodes, herein represented as a neon tube is preferred as a signal light because it is conducting only at a definite elevated threshold voltage so that it has a sharp start and stop of illumination, and can accommodate itself to a large voltage range above the threshold voltage. It also has no fragile parts to break under vibration and requires but little power.

Energization of the tube from a low voltage source through a transformer at the tube simplifies the wiring and the insulation thereof.

Operation of the tube under control of engine speed, in addition to indicating car-speed changes, also provides for the desirable indication of a temporary starting condition of the car.

One of the requisites of this invention is that the separate flashes of the signal light be discernable up to a substantial car speed. Hence the length of time between flashes should be greater than the length of time that the sensation of light persists with the average observer, for the separate flashes to be readily observed below such car speed. To this end the energization pulse formulating means (circuit interrupter 17, generator 92) is operated at sufficiently slow speed to provide visually separate flashes of the signal light up to the engine speed corresponding to the predetermined car speed. The predetermined car speed is selected as one below which it is probable that some change in operation of the car is intended.

Having thus described my invention, what I claim as new and desire to secure by Letters Patent of the United States is:

In a motor vehicle having an engine for propelling the vehicle, a neon warning lamp, a transformer at the lamp having its high tension secondary winding connected to the lamp, a low tension generator remote from the lamp and transformer and rotated by the engine, low tension leads extended from the generator and connected to the low tension primary winding of the transformer, said generator being an alternating current generator initiating separated current pulses for energizing said transformer and illuminating said lamp, and means providing relative speeds of the engine and generator such that the lamp appears to glow steadily when the vehicle is travelling above a predetermined speed and visually distinct flashes of illuminations of said lamp are apparent at vehicle speeds below said predetermined speed.

JOHN JOYCE.